Sept. 12, 1961    M. R. HUTCHISON, JR., ET AL    2,999,441
AUTOMATIC EXPOSURE CONTROL SYSTEM FOR PHOTOGRAPHIC CAMERAS
Filed March 2, 1959    3 Sheets-Sheet 1

Miller R. Hutchison
Robert F. O'Brien
Edgar S. Marvin
INVENTORS
BY R. Frank Smith
Robert W. Hampton
ATTORNEYS Miller R. Hutchison
Robert F. O'Brien
Edgar S. Marvin
INVENTORS

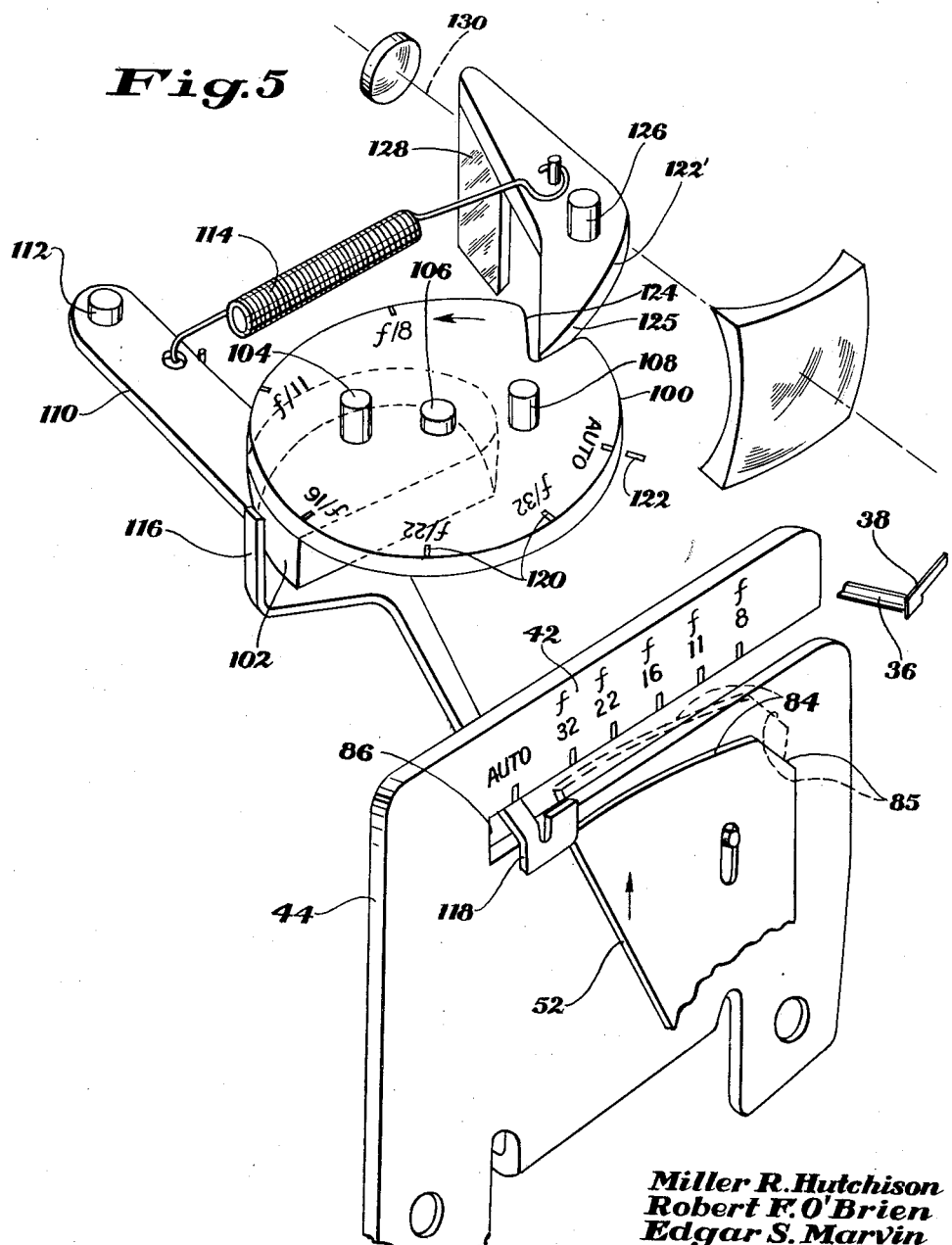

United States Patent Office 2,999,441
Patented Sept. 12, 1961

2,999,441
AUTOMATIC EXPOSURE CONTROL SYSTEM FOR PHOTOGRAPHIC CAMERAS
Miller H. Hutchison, Jr., Robert F. O'Brien, and Edgar S. Marvin, Rochester, N.Y., assignors to Eastman Kodak Company, Rochester, N.Y., a corporation of New Jersey
Filed Mar. 2, 1959, Ser. No. 796,309
11 Claims. (Cl. 95—10)

The present invention relates to photographic cameras and more particularly concerns automatic exposure control systems for such cameras.

The exposure control system of a camera, that is, the means for regulating the diaphragm aperture or shutter speed or some combination of these, may be operated automatically in response to variations in the brightness of the scene or object which is to be photographed. One method of automatically regulating such exposure has been to employ a photosensitive device, such as a galvanometer-type electrical measuring instrument coupled to a photoelectric cell, for positioning a light-weight pointer as a function of scene brightness. The position of the pointer is then sensed by a member yieldably driven by manual operation. The yieldably driven member may set shutter speed or diaphragm opening or both.

It is a principal object of the present invention to provide an improved exposure control system of the foregoing type, wherein an extremely light load is applied to the pointer of a moving coil measuring instrument when the position of that pointer is sensed in order to establish an exposure factor.

A further object of the invention is to manually override the automatic operation of an exposure system of this type.

Another object is to provide a viewfinder signal to indicate the automatic or manual setting of a camera in which the exposure control system may be selectively adjusted for automatic or manual operation.

Other objects of the invention will appear from the following description, reference being made to the accompanying drawings, wherein:

FIG. 5 is an isometric view of the manual control feature of the camera, showing the viewfinder-signal mechanism.

IN GENERAL

Figure 1:
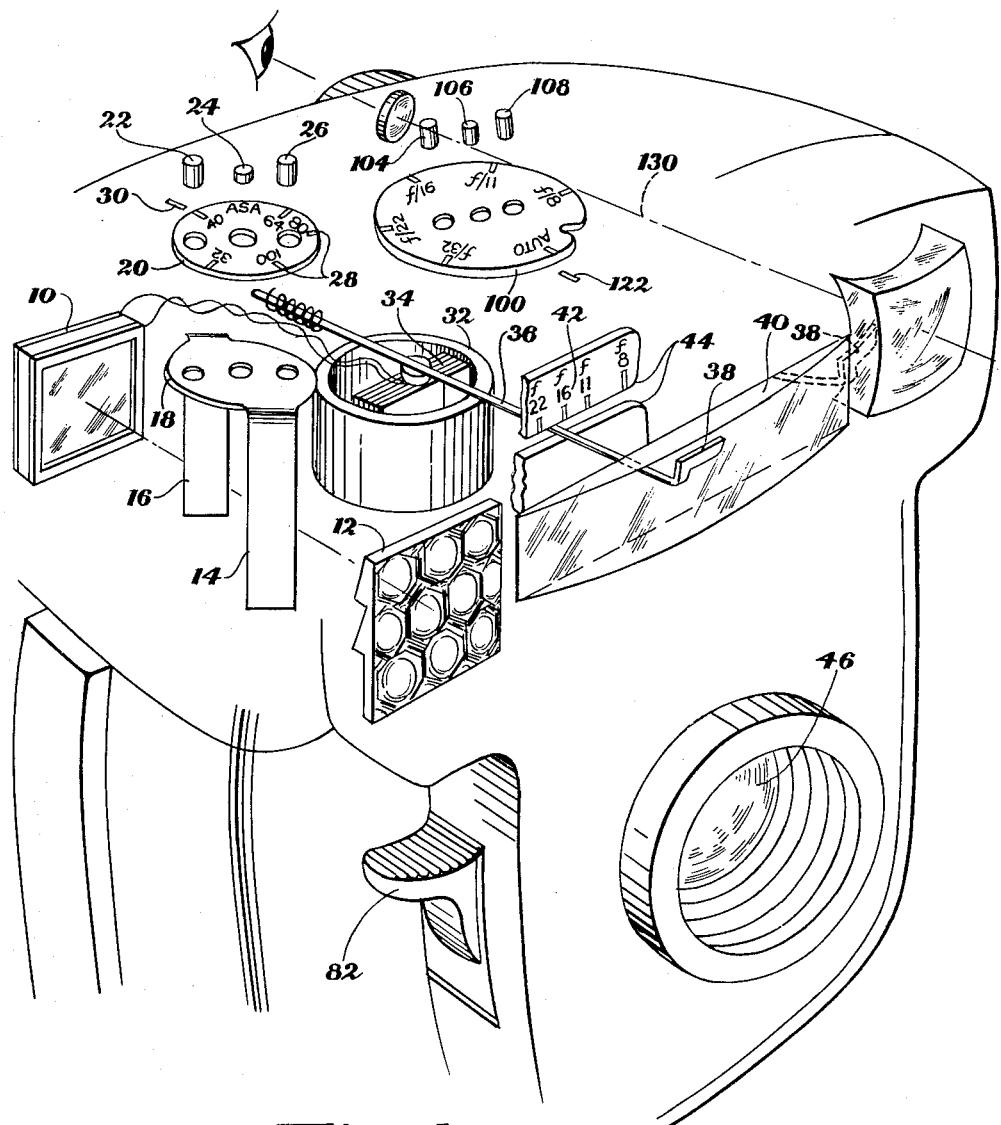
FIG. 1 is an exploded isometric view of the photocell system, the electrical measuring instrument and related camera elements.

The camera shown in the drawings comprises a cat's-eye diaphragm having two blades, or vanes, that are moved apart when the camera operating lever is manually actuated. The vane movement is limited to determine the diaphragm opening, either automatically as a function of scene brightness or in accordance with a manually set aperture value. A single setting member shifts the diaphragm operation between automatic and manual and selects any manually set diaphragm opening. This setting member also controls a signal in the viewfinder of the camera to indicate whether the camera is set for automatic or manual operation.

Referring to FIG. 1, the camera includes a photoelectric cell 10 positioned for exposure to a scene or object which is to be photographed. Light from the scene or object is focused on cell 10 by a lens block 12, which may be formed as a stepped wedge in order to exclude skylighting.

The sensitivity of cell 10 may be adjusted for changes in film speed by rotating a pair of thin, rectangular baffle members 14 and 16 in the space separating lens block 12 and cell 10. Baffle members 14 and 16 are mounted on a common frame 18, which is secured to a scale disk 20, for example by pins 22, 24 and 26. Disk 20 is located on the outer surface of the camera and carries spaced indicia such as 28 which are graduated in any convenient system of film-speed values and which cooperate with a fixed index mark 30. Pins 22 and 26 may extend sufficiently above the surface of disk 20 to form a manual grip for rotating disk 20 and baffle members 14 and 16.

The photoelectric cell is connected to and energizes an electrical measuring instrument 32 of the galvanometer type, having a pivoted coil 34 whose angular position is a function of the degree of energization of the instrument by cell 10. Coil 34 carries a pointer 36 having a tip 38 that swings in a window 40 in the front of the camera. Pointer 36 cooperates with an aperture scale 42 on an anvil 44, which will be described hereinafter, to indicate in window 40 the diaphragm opening corresponding to the instantaneous scene brightness.

The combination of cell and instrument is only illustrative of a class of devices that may be referred to as "photoelectric-to-mechanical transducers," which respond to changes of light intensity by producing some change of mechanical movement or position. It will be obvious, for example, that the pivoted-coil instrument illustrated in the drawings may be replaced by a solenoid, a hot-wire actuator or the like within the scope of the invention.

The camera also includes a lens system, indicated at 46. Aligned with the axis of the lens system are a diaphragm mechanism and a shutter, described below, and a photosensitive surface such as a filmstrip (not shown).

EXPOSURE CONTROL

Automatic operation

Figure 2:
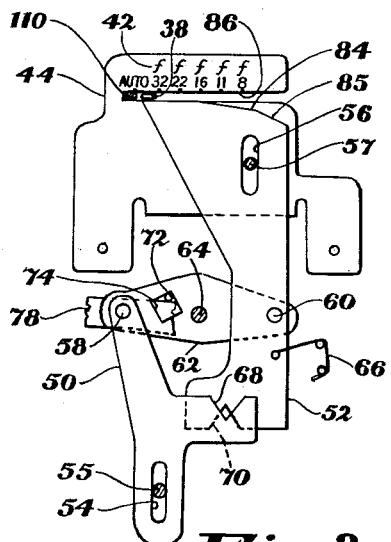
FIG. 2 is a front view of the diaphragm control mechanism at minimum aperture during automatic operation.
Figure 3:
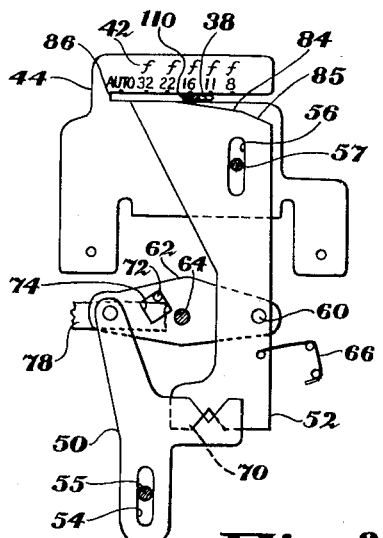
FIG. 3 is a front view of the diaphragm control mechanism at an intermediate, manually controlled aperture.
Figure 4:
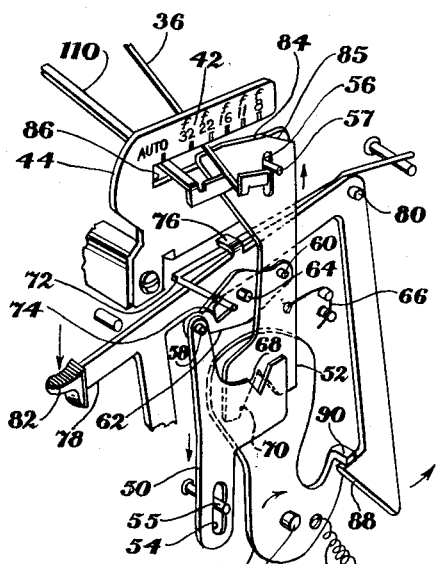
FIG. 4 is an isometric view of the mechanism shown in FIGS. 2 and 3, also showing a portion of the shutter mechanism.

Referring to FIGS. 2–4, the diaphragm employed in the present invention comprises a pair of blades or vanes 50 and 52 having respective slots 54 and 56, through which the vanes are guided for vertical movement by respective pins 55 and 57. Vanes 50 and 52 are pivotally linked at 58 and 60 to a rocking lever 62, which is pivoted at 64 to couple the two vanes together for opposed linear movement. A light spring 66 is secured to vane 52 and urges the latter upward, thereby tending to rock lever 62 counterclockwise for moving vane 50 downward. A pair of notches 68 and 70 on the respective vanes cooperate in overlapping relation in axial alignment with the lens system, to form a cat's-eye diaphragm whose aperture area depends upon the vertical positions of the two vanes.

The diaphragm vanes normally are maintained in maximum overlapping position wherein they block the lens axis, with lever 62 being maintained in its maximum clockwise position against the tension of spring 66. The mechanism for maintaining the vanes in this position comprises a second and stronger spring 72, the free end of which engages the upper surface of an aperture 74 in lever 62 and tends to rock that lever clockwise. Spring 72 also engages the bottom surface of ear 76 on the camera operating lever 78, which is pivoted at 80, and thereby normally maintains the operating lever in a clockwise position, wherein a manual operating knob 82 (see also FIG. 1) on the end of the operating lever is in a raised position. When knob 82 is depressed by manual actuation, lever 78 is rocked counterclockwise and its ear 76 forces the free end of spring 72 downward, permitting the weaker spring 66 to raise vane 52, thereby rocking lever 62 counterclockwise, lowering vane 50 and increasing the size of the diaphragm opening.

A first cam surface 84, on the top edge of vane 52 and approximately coextensive with scale 42 on anvil 44, engages the instrument pointer 36, as shown in FIGS. 2 and 4. Pointer 36 swings in a slot 86 in the previously mentioned anvil 44, which backs up the pointer to minimize the force applied to the instrument bearings. Cam surface 84 is so shaped that the upward movement of vane 52 is limited by pointer 36, during automatic operation of the camera, to form a diaphragm aperture of a size corresponding to the scene brightness and corresponding to the position of pointer 36 relative to scale 42.

Upon further depression of knob 82, a shoulder 88 on lever 78 moves out of its normal engagement with an ear 90 on a shutter member 92, which is axially aligned with the lens system and normally caps the diaphragm opening. Shutter member 92 is pivoted at 93 and is urged clockwise by a spring 94. Disengagement of shoulder 88 from ear 90 permits the shutter member 92 to rock clockwise and thereby uncover the diaphragm aperture to make an exposure. The structural and operational details of this shutter are disclosed in the copending U.S. Application Serial No. 553,632, filed December 16, 1955, now Patent No. 2,874,624.

When knob 82 is released after an exposure, lever 78 is rocked clockwise to its initial position by the upward force applied by spring 72 to ear 76. Spring 72 also rocks lever 62 clockwise, thereby forcing vane 50 upward and vane 52 downward against the tension of the lighter spring 66. Shutter member 92 is restored to its latched position by means disclosed in the aforementioned copending application. In this manner the exposure control system is prepared for a next operation.

It is important to note that a very light spring 66 is used to drive the diaphragm vanes, whereas a heavier spring 72 is used to return the operating lever to its initial position. Similar control systems of the prior art have used a single spring for both purposes and have been substantially inoperative because of the damage caused to the instrument pointer by the sensing member if the single drive spring was made heavy enough to effectively restore the operating lever.

In situations where the scene brightness is insufficient for automatic operation of the camera, the instrument pointer 38, which is then beyond the low end (righthand, as shown in the drawings) of scale 42, extends into the field of view of a viewfinder whose axis is indicated at 130 (FIG. 1). This position of pointer 38 is shown in broken lines in FIG. 1.

*Manual operation*

For flash operation, as well as for instances involving unusual backlighting, it is desirable to control the diaphragm setting manually rather than automatically. In such case it is convenient for the camera operator to be apprised of the fact that the camera is adjusted for manual diaphragm control. The present invention includes both a manual diaphragm control means and a viewfinder signal that indicates the adjustment of the camera for automatic or manual diaphragm control.

Referring to FIG. 5, a disk 100 on the outer surface of the camera overlies and is secured to a cam 102 by means of pins such as 104 and 106. Pin 104 and a third pin 108 may extend above the surface of disk 100 sufficiently to permit manual turning of disk 100 and cam 102. A lever 110 is pivoted at 112 and is urged counterclockwise about that pivot by a spring 114 to engage an ear 116 on the lever to engage the peripheral surface of cam 102. A tip 118 of lever 110 swings in the slot 86 of anvil 44 along with the instrument pointer 36. Disk 100 has on its outer surface a series of indicia such as 120, which are graduated in any convenient system of aperture values and which cooperate with a fixed index mark 122. The shape of cam 102 is such that lever tip 118 assumes a position relative to scale 42 corresponding to the position of indicia 120 relative to index mark 122.

During automatic operation of the camera, an indicium "Auto," or its equivalent, on disk 100 is opposite mark 122 and lever tip 118 is opposite a corresponding indicium of scale 42, where that tip lies outside the path of diaphragm vane 52. In this case, pointer 36 cooperates with vane 52 as previously described to limit the diaphragm opening. In order to adjust the camera for manual diaphragm control, disk 100 is rotated counterclockwise to decrease the radius of the periphery of cam 102 in contact with lever ear 116; therefore, lever 110 is rocked counterclockwise about pivot 112 and into the path of vane 52. Subsequent actuation of the camera operating lever 78 (FIG. 4) causes the cam surface 84 (FIG. 5) of vane 52 to engage lever 110, so that lever 110 limits the diaphragm opening, regardless of the position of pointer 36. Since the highest portion of the cam surface 84 on vane 52 is to the left (as viewed in the drawings), this cam surface always engages lever 110 and never engages pointer 36, if the camera is adjusted for manual diaphragm control. Lever tip 118 extends to the right of lever 110 and limits the leftward movement of pointer 36 to ensure the interception of cam surface 84 by lever 110 when the diaphragm is under manual control.

A nose 125 on a lever 122' engages a notch 124 on disk 100 when the latter is in its clockwise position for automatic operation. Lever 122' is pivoted at 126 and is urged counterclockwise about that pivot by spring 114. A flag member 128, which is preferably formed of a colored, transparent material, is integral with lever 122' and lies outside the optical axis 130 of the viewfinder when the camera is adjusted for automatic operation. However, when disk 100 is rotated counterclockwise for manual diaphragm control, lever nose 125 is cammed out of notch 124 and pivots lever 122' clockwise. Flag 128 swings into the field of view of the viewfinder and thereby indicates in the viewfinder that the camera is set for manual diaphragm control. It will be obvious, of course, that the operation of lever 122' may be reversed to place the signal in the viewfinder during automatic operation and remove it from the viewfinder during manual diaphragm control.

It should be noted that if the camera operating lever 82 (FIG. 4) is held in its depressed, or actuated, position while disk 100 (FIG. 5) is rotated to change the position of lever 110, vane 52 is in its full upward position, as shown in broken lines in FIG. 5, and there can be interference between lever 110 and vane 52. If lever 110 is offscale to the left of vane 52 and an attempt is made to move it to the right with the vane fully raised, the lever simply contacts the vane and is held to the left while the surface of cam 102 moves away from ear 116 on the lever. On the other hand, if lever 110 is offscale to the right and an attempt is made to move it to the left with the vane fully raised, the lever engages an offscale cam surface 85 on the vane and is cammed upward into engagement with the onscale cam surface 84 of the vane. In either such case no damage is done to the camera elements by such interference.

The invention has been described in detail with particular reference to preferred embodiments thereof, but it will be understood that variations and modifications can be effected within the spirit and scope of the invention as described hereinabove and as defined in the appended claims.

We claim:

1. In a camera having a lens system for focusing an image of a viewed scene onto a photosensitive surface; a photocell positioned for energization by said scene; an electric measuring instrument having a pivoted coil connected to said cell and energized thereby to assume an angular position as a function of the intensity of said light; a pointer driven by said coil; an actuating device accessible to the camera operator; at least one movable diaphragm vane forming an exposure aperture aligned with said lens system, the size of said aperture being a function of the position of said vane; and sensing means connected to said vane for movement in a predetermined path to sense the position of said pointer upon movement of said vane, for determining the size of said aperture; an arrangement for positioning said vane, comprising: a first spring normally maintaining said actuating device in an initial position and adapted to be overcome by manual movement of said device away from said initial position; a second spring opposed to said first spring and having a force lighter than the force of said first spring, for moving said vane and for moving said sensing means into engagement with said pointer in response to movement of said actuating device away from said initial position; override means adapted for movement into the path of said sensing means for intercepting said sensing means irrespective of the position of said pointer; and manually operable selecting means coupled to said override means for moving the latter into said path.

2. In a camera having a lens system for focusing an image of a viewed scene onto a photosensitive surface; a photoelectric-to-mechanical transducer positioned for energization by light from said scene, with a mechanical output member constituting a part of said transducer and positioned thereby as a function of the intensity of said light; adjustable means aligned with said lens system for regulating the exposure of said photosensitive surface; and an actuating device accessible to the camera operator; the combination comprising: means for temporarily operating said actuating device; driving means coupled to said regulating means and operable, in response to operation of said actuating device, for yieldably driving a part of said regulating means through a predetermined path into engagement with said output member to limit the adjustment of said regulating means as a function of the position of said output member; restoring means separate from said driving means for restoring said actuating device to its unoperated condition following operation thereof, said restoring means having a force greater than the force of said driving means; override means adapted to be moved into and out of the path of said part of the regulating means and operable, upon being moved into said path, for intercepting said part to limit the adjustment of said regulating means irrespective of the position of said output member; and manually operable selecting means coupled to said override means for moving the latter into and out of said path.

3. In a camera having a lens system for focusing an image of a viewed scene onto a photosensitive surface; a photoelectric-to-mechanical transducer positioned for energization by light from said scene; adjustable means aligned with said lens system and controlled by said transducer automatically for regulating the exposure of said photosensitive surface as a function of the intensity of said light; and a viewfinder; the combination comprising: override means for adjusting said regulating means irrespective of the intensity of said light; a manually adjustable knob connected to said override means, and having a first position for disabling said override means, and having a range of second positions for enabling said override means; a flag disposed for movement between one position in said viewfinder and another position out of said viewfinder; and a cam and cam follower interrelating said flag and said knob for moving said flag to one of its positions when said knob is in its first position and for moving said flag to its other position when said knob is in its range of second positions.

4. In a camera having means for focusing an image of a photographic subject onto a photosensitive surface, exposure control means comprising, in combination: an exposure meter adapted to be energized by light from said subject and having a control member moving as a function of the intensity of said light; at least one movable diaphragm vane forming an exposure aperture optically aligned with said focusing means, the size of said aperture being a function of the position of said vane; sensing means connected to said vane for movement in a predetermined path to sense the position of said control member upon movement of said vane, for determining the size of said aperture; an actuating device accessible to the camera operator; drive means connected to said vane and controlled by said actuating device, in response to movement of the latter, for moving said vane and for moving said sensing means into engagement with said control member; override means adapted for movement into the path of said sensing means for intercepting said sensing means irrespective of the position of said control member; and manually operable selecting means coupled to said override means for moving the latter into said path.

5. In a camera having a lens system for focusing an image of a viewed scene onto a photosensitive surface; a photoelectric-to-mechanical transducer positioned for energization by light from said scene; adjustable means aligned with said lens system and controlled by said transducer automatically for regulating the exposure of said photosensitive surface as a function of the intensity of said light; and a viewfinder; the combination comprising: override means for controlling said regulating means irrespective of the intensity of said light; a manually adjustable knob connected to said override means and having a first position for disabling said override means, and having a range of second positions for enabling said override means; an indicator disposed for movement between one position in said viewfinder and another position out of said viewfinder; and mechanism coupling said indicator and said knob for moving said indicator to one of its positions when said knob is in its first position and for moving said indicator to its other position when said knob is in its range of second positions.

6. The combination defined in claim 1, with: a viewfinder integral with said camera; and an indicator flag coupled to said selecting means for movement into said viewfinder in response to movement of said override means into said path.

7. The combination defined in claim 1, with a cam surface connected to said sensing means for engaging said override means upon movement of the latter into said path when said sensing means is in its sensing position.

8. The combination defined in claim 2, with indicator means coupled to said selecting means and adapted to be moved relative to a viewing locus in response to movement of said override means into and out of said path.

9. The combination defined in claim 8, wherein said viewing locus comprises a viewfinder and said inidcator means comprises a flag movable into and out of said viewfinder.

10. In a camera having a lens system for focusing an image of a viewed scene onto a photosensitive surface; a photoelectric-to-mechanical transducer positioned for energization by light from said scene, with a mechanical output member constituting a part of said transducer and positioned thereby as a function of the intensity of said light; adjustable means aligned with said lens system for regulating the exposure of said photosensitive surface; and an actuating device accessible to the camera operator; the combination comprising: means for temporarily operating said actuating device; driving means interrelating said actuating device and said regulating means and operable, in response to operation of said actuating device, for yieldably driving a part of said regulating means through a predetermined path into engagement with said output member to limit the adjustment of said regulating means as a function of the position of said output member; override means adapted to be moved into and out of the path of said part of the regulating means and operable, upon being positioned in said path, for intercepting said part to limit the adjustment of said regulating means irrespective of the position of said output member; and manually operable selecting means coupled to said override means for positioning the latter.

11. In a camera having a lens system disposed along a lens axis for focusing an image of a viewed scene onto a photosensitive surface; a photoelectric-to-mechanical transducer positioned for energization by light from said scene, with a mechanical output member constituting a part of said transducer and positioned thereby as a function of the intensity of said light; and manually operable camera actuating means; the combination comprising: at least one diaphragm vane having an aperture on said axis and coupled to said camera actuating device for movement from a first position to a second position in a predetermined path substantially perpendicular to said axis in response to operation of said device, to vary the area of said aperture on said axis; a first cam surface on said vane for engaging said member, in response to movement of said vane, to determine said second position of said vane as a function of the position of said member; manually controlled override means movable into said path for intercepting said first cam surface irrespective of the position of said member; and a second cam surface on said vane for engaging said override means upon movement of said override means into said path when said vane is in said second position.

References Cited in the file of this patent

UNITED STATES PATENTS

| | | |
|---|---|---|
| 2,058,531 | Tuttle | Oct. 27, 1936 |
| 2,058,532 | Tuttle | Oct. 27, 1936 |
| 2,061,909 | Karg | Nov. 24, 1936 |
| 2,358,083 | Mihalyi | Sept. 12, 1944 |
| 2,841,064 | Bagby et al. | July 1, 1958 |

UNITED STATES PATENT OFFICE
CERTIFICATE OF CORRECTION

Patent No. 2,999,441            September 12, 1961

Miller R. Hutchison, Jr., et al.

It is hereby certified that error appears in the above numbered patent requiring correction and that the said Letters Patent should read as corrected below.

In the grant, line 1, and in the heading to the printed specification, line 4, for "Miller H. Hutchison, Jr.", each occurrence, read -- Miller R. Hutchison, Jr. --; column 6, line 51, for "inidcator" read -- indicator --.

Signed and sealed this 27th day of March 1962.

(SEAL)
Attest:

ERNEST W. SWIDER
Attesting Officer

DAVID L. LADD
Commissioner of Patents

Disclaimer 2,999,441.—*Miller R. Hutchison, Jr., Robert F. O'Brien*, and *Edgar S. Marvin*, Rochester, N.Y. AUTOMATIC EXPOSURE CONTROL SYSTEM FOR PHOTOGRAPHIC CAMERAS. Patent dated Sept. 12, 1961. Disclaimer filed Feb. 5, 1965, by the assignee, *Eastman Kodak Company*.

Hereby enters this disclaimer to claims 1, 2, 4, 7, 8 and 10 of said patent.
[*Official Gazette June 15, 1965.*]